United States Patent
Commaret et al.

(10) Patent No.: US 10,760,436 B2
(45) Date of Patent: Sep. 1, 2020

(54) ANNULAR WALL OF A COMBUSTION CHAMBER WITH OPTIMISED COOLING

(71) Applicant: SAFRAN AIRCRAFT ENGINES, Paris (FR)

(72) Inventors: Patrice Andre Commaret, Moissy-Cramayel (FR); Jacques Marcel Arthur Bunel, Moissy-Cramayel (FR); Romain Nicolas Lunel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 235 days.

(21) Appl. No.: 15/579,006

(22) PCT Filed: May 27, 2016

(86) PCT No.: PCT/FR2016/051263
§ 371 (c)(1),
(2) Date: Dec. 1, 2017

(87) PCT Pub. No.: WO2016/193589
PCT Pub. Date: Dec. 8, 2016

(65) Prior Publication Data
US 2018/0142563 A1 May 24, 2018

(30) Foreign Application Priority Data
Jun. 3, 2015 (FR) ..................................... 15 55050

(51) Int. Cl.
*F23R 3/06* (2006.01)
*F01D 9/02* (2006.01)
(Continued)

(52) U.S. Cl.
CPC ............. *F01D 9/023* (2013.01); *F01D 25/12* (2013.01); *F02C 7/04* (2013.01); *F02C 7/18* (2013.01);
(Continued)

(58) Field of Classification Search
CPC .... F23R 3/04; F23R 3/06; F23R 2900/03042; F23R 2900/03041; F05D 2260/202; F05D 2260/203
See application file for complete search history.

(56) References Cited

U.S. PATENT DOCUMENTS

| | | | |
|---|---|---|---|
| 6,170,266 B1* | 1/2001 | Pidcock | F23R 3/06 60/755 |
| 2007/0271926 A1* | 11/2007 | Alkabie | F23R 3/06 60/772 |

(Continued)

FOREIGN PATENT DOCUMENTS

| | | |
|---|---|---|
| EP | 2 759 772 A1 | 7/2014 |
| WO | 2013/060987 A2 | 5/2013 |

OTHER PUBLICATIONS

International Search Report dated Sep. 21, 2016 in PCT/FR2016/051263 filed May 27, 2016.

*Primary Examiner* — Gerald L Sung
(74) *Attorney, Agent, or Firm* — Oblon, McClelland, Maier & Neustadt, L.L.P.

(57) ABSTRACT

An annular turbine engine combustion chamber wall including air admission orifices to create zones of steep temperature gradient, and cooling orifices to enable the air flowing on the cold side to penetrate to the hot side in order to form a film of cooling air along the annular wall, the annular wall being further includes, in the zones of steep temperature gradient, multi-perforation holes having respective bends of an angle α greater than 90°, the angle α being measured between an inlet axis Ae and an outlet axis As of the (Continued)

multi-perforation hole, the outlet axis of the multi-perforation hole being inclined at an angle θ3 relative to the normal N to the annular wall through which the multi-perforation holes with bends are formed, in a "gyration" direction that is at most perpendicular to the axial flow direction D of the combustion gas.

11 Claims, 3 Drawing Sheets

(51) Int. Cl.
*F01D 25/12* (2006.01)
*F02C 7/04* (2006.01)
*F02C 7/18* (2006.01)

(52) U.S. Cl.
CPC .......... *F23R 3/06* (2013.01); *F05D 2260/202* (2013.01); *F05D 2260/203* (2013.01); *F23R 2900/03041* (2013.01); *F23R 2900/03042* (2013.01)

(56) References Cited

U.S. PATENT DOCUMENTS

| | | | |
|---|---|---|---|
| 2009/0071161 A1* | 3/2009 | Critchley | F23R 3/06 60/754 |
| 2012/0117973 A1* | 5/2012 | Gerendas | F23R 3/06 60/755 |
| 2014/0260257 A1 | 9/2014 | Rullaud et al. | |
| 2014/0338347 A1 | 11/2014 | Gage et al. | |
| 2015/0107798 A1 | 4/2015 | Pfitzner et al. | |
| 2016/0245094 A1* | 8/2016 | Bunker | F01D 5/186 |

* cited by examiner

ANNULAR WALL OF A COMBUSTION CHAMBER WITH OPTIMISED COOLING

BACKGROUND OF THE INVENTION

The present invention relates to the general field of turbine engine combustion chambers. The invention relates more particularly to an annular wall for a forward-flow or a reverse-flow combustion chamber that is cooled by a "multi-perforation" method.

Typically, an annular turbine engine combustion chamber is made up of an inner annular wall (also referred to as an inner shroud) and an outer annular wall (also referred to as an outer shroud) that are connected together upstream by a transverse wall forming the chamber end wall.

Each of the inner and outer shrouds is provided with a plurality of various kinds of air admission holes and orifices enabling the air that flows around the combustion chamber to penetrate into the inside of the combustion chamber.

Thus, so-called "primary" and "dilution" holes are formed in these shrouds to convey air to the inside of the combustion chamber. The air passing through the primary holes contributes to creating an air/fuel mixture that is burnt in the chamber, while the air coming from the dilution holes is for enhancing the dilution of that air/fuel mixture.

The inner and outer shrouds are subjected to the high temperatures of the gas resulting from combustion of the air/fuel mixture.

For cooling purposes, additional "multi-perforation" orifices are also made through those shrouds over their entire surface area. These multi-perforation orifices are generally inclined at 60° and they enable the air flowing outside the chamber to penetrate into the inside of the chamber so as to form films of cooling air along the shrouds.

Nevertheless, in practice, it is found that the zones of the inner and outer shrouds that are situated around, and in particular directly downstream from, each of the primary or dilution holes present an absence of orifices as a result of the laser drilling technology used, and that they therefore benefit from a low level of cooling only, which implies that they suffer a risk of cracks forming and propagating.

In order to solve that problem, the Applicant has made proposals in its application FR 2 982 008 to provide additional cooling orifices immediately downstream from the primary holes or the dilution holes, the additional cooling orifices being arranged in a plane perpendicular to the flow direction of the combustion gas.

Nevertheless, although those additional orifices, which are said to be gyratory (because they are at 90°), do indeed deliver cooling that is effective compared with conventional axial multi-perforation for which the air film is stopped by the presence of those holes, they still suffer from certain drawbacks, in particular as a result of being fed solely by the static pressure of the air flowing around the combustion chamber.

OBJECT AND SUMMARY OF THE INVENTION

The present invention thus seeks to mitigate such drawbacks by proposing an annular combustion chamber wall that makes use of the total pressure of the air and that thus provides better cooling of those zones in which cracks are likely to start, and in particular those zones situated directly downstream from the primary and dilution holes.

To this end, there is provided an annular turbine engine combustion chamber wall having a cold side and a hot side, said annular wall comprising:

- a plurality of air admission orifices distributed along at least one circumferential row to enable the air flowing on said cold side to penetrate to said hot side, said air admission orifices creating around them zones of steep temperature gradient; and
- a plurality of cooling orifices to enable the air flowing on said cold side to penetrate to said hot side in order to form a film of cooling air along said annular wall, said cooling orifices being distributed in a plurality of circumferential rows that are axially spaced apart from one another and the axes of each of said cooling orifices being inclined in an axial flow direction D of the combustion gas at an angle of inclination $\theta_1$ relative to a normal N to said annular wall;

said annular wall being characterized in that it further comprises, in said zones of steep temperature gradient, multi-perforation holes having respective bends of an angle $\alpha$ greater than 90°, said angle $\alpha$ being measured between an inlet axis Ae and an outlet axis As of said multi-perforation hole, said outlet axis of said multi-perforation hole being inclined at an angle $\theta_3$ relative to said normal N to said annular wall through which said multi-perforation holes with bends are formed, in a "gyration" direction that is at most perpendicular to said axial flow direction D of the combustion gas.

The presence of these cooling orifices that are angled within the wall of the combustion chamber so as to be fed like axial multi-perforation holes on the cold side while nevertheless opening out in the hot side like gyratory multi-perforation holes, makes it possible to obtain good cooling with the best features of conventional axial multi-perforation and of gyratory multi-perforation.

Advantageously, said angle $\alpha$ lies in the range 90° to 170° and said gyration direction is inclined relative to said axial flow direction D of the combustion gas at an angle $\beta$ lying in the range 50° to 90°.

Preferably, said multi-perforation holes present a diameter $d_3$, preferably identical to said diameter $d_1$ of said cooling orifices, and said outlet angle of inclination $\theta_3$ is preferably identical to said angle of inclination $\theta_1$ of said cooling orifices, each of said multi-perforation holes possibly presenting a varying profile so as to optimize cooling locally.

Advantageously, said inlet axis of said multi-perforation hole is inclined at an angle $\theta_4$ relative to said normal N to said annular wall in an axial flow direction D of the combustion gas, said inlet angle of inclination $\theta_4$ preferably being identical to said angle of inclination $\theta_1$ of said cooling orifices.

Preferably, said multi-perforation holes split into two after a bend portion so as to form two air outlets opening out into the hot side, and the or both air outlet(s) opening out into the hot side of each of said multi-perforation holes may present a varying diameter $d_3$ in the shape of a cone.

Depending on the embodiment that is envisaged, said air admission orifices are primary holes enabling the air flowing on said cold side to penetrate to said hot side in order to create an air/fuel mixture or said air admission orifices are dilution holes enabling the air flowing on said cold side to penetrate to said hot side in order to dilute the air/fuel mixture.

The present invention also provides a combustion chamber and a turbine engine (having a combustion chamber) including an annular wall as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
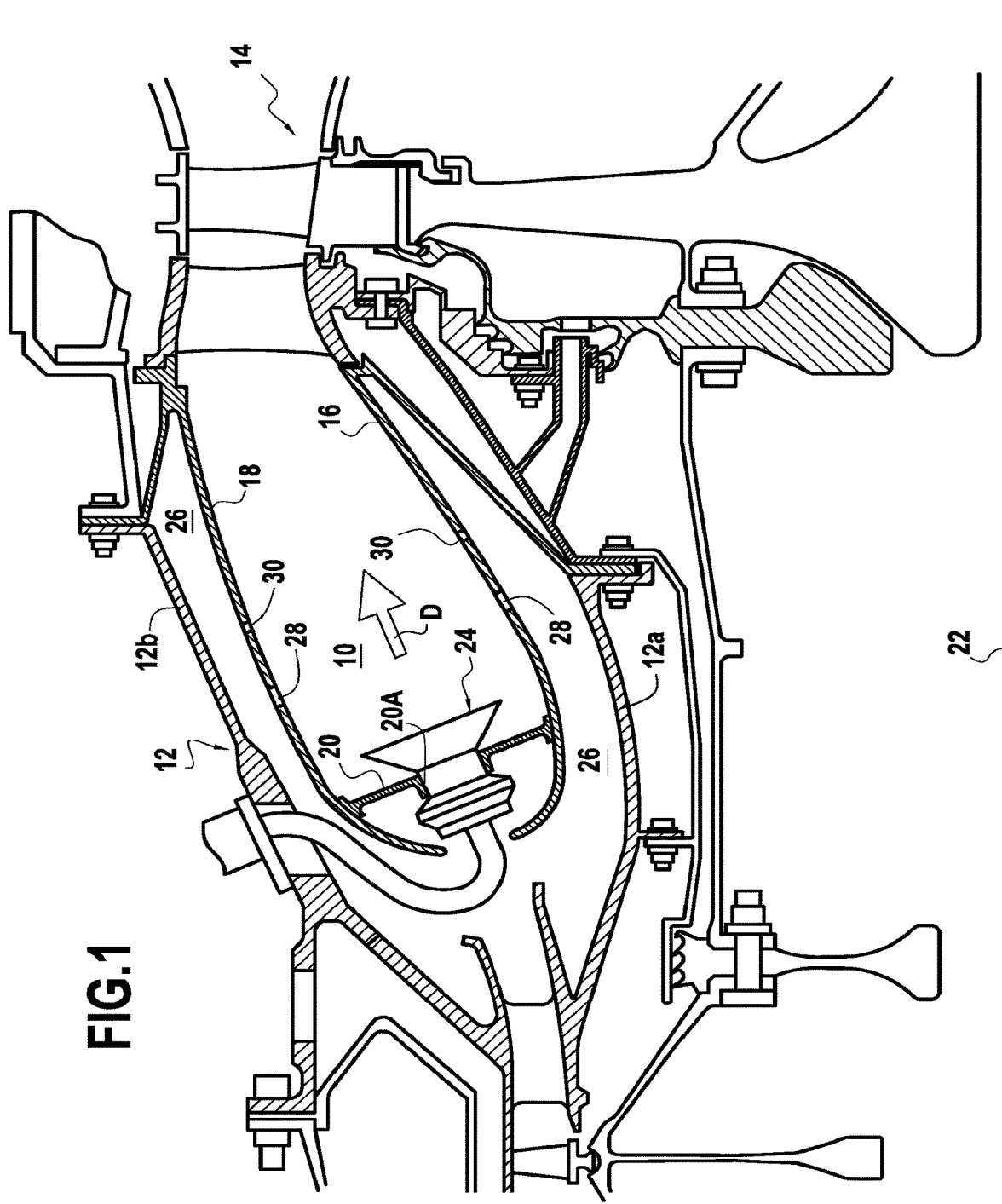
FIG. 1 is a longitudinal section view of a turbine engine combustion chamber in its environment.

FIG. 1 shows a turbine engine combustion chamber 10 in its environment. Such an engine includes in particular a compression section (not shown) in which air is compressed prior to being injected into a chamber casing 12, and then into the combustion chamber 10 that is mounted inside it. The compressed air penetrates via air admission orifices into the combustion chamber and it is mixed with fuel prior to being burnt therein. The gas resulting from such combustion is then directed towards a high pressure turbine 14 arranged at the outlet from the combustion chamber.

The combustion chamber is of the annular type. It is made up of an inner annular wall 16 and an outer annular wall 18 that are joined together at their upstream ends by a transverse wall 20 forming a chamber end wall. The combustion chamber may be a forward-flow chamber or a reverse-flow chamber. Under such circumstances, a return bend is placed between the combustion chamber and the nozzle of the turbine.

The inner and outer annular walls 16 and 18 extend along a longitudinal axis that slopes a little relative to the longitudinal axis 22 of the engine. The chamber end wall 20 is provided with a number of openings 20A having mounted therein the same plurality of fuel injectors 24.

The chamber casing 12, which is made up of an inner shell 12a and an outer shell 12b, co-operates with the combustion chamber 10 to form annular spaces 26 into which compressed air is admitted for the purposes of combustion, dilution, and cooling the chamber.

Figure 4:
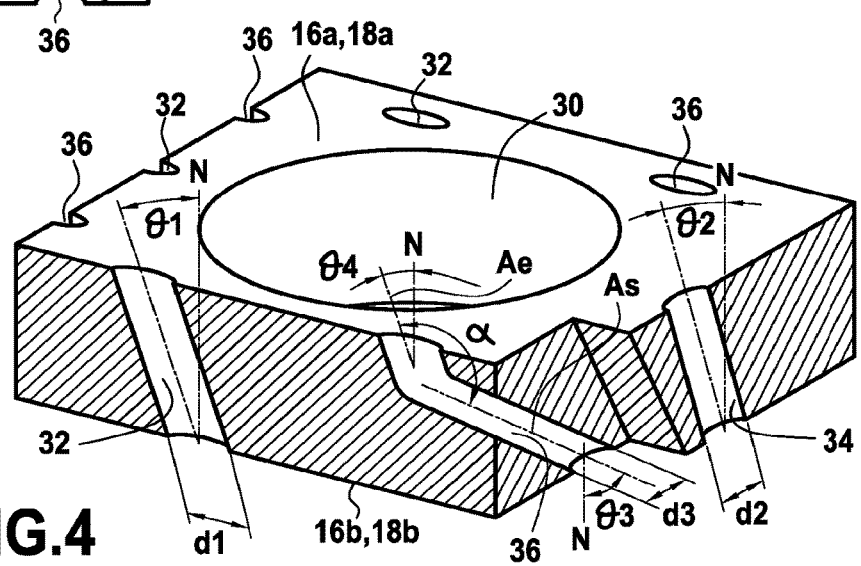

Each of the inner and outer annular walls 16 and 18 presents a respective cold side 16a, 18a beside the annular space 26 in which compressed air flows, and a respective hot side 16b, 18b facing towards the inside of the combustion chamber (see FIG. 4).

The combustion chamber 10 is subdivided into a "primary" zone (or combustion zone) and a "secondary" zone (or dilution zone) situated downstream therefrom (where downstream should be understood relative to the general axial flow direction of the gas that results from combustion of the air/fuel mixture inside the combustion chamber, and represented by arrow D).

The air that feeds the primary zone of the combustion chamber penetrates via a circumferential row of primary holes 28 formed in the inner and outer annular walls 16 and 18 of the chamber over the entire circumference of each of these annular walls. Each of these primary holes has a downstream edge aligned on a common line 28A. The air feeding the secondary zone of the chamber passes through a plurality of dilution holes 30 also formed in the inner and outer annular walls 16 and 18 over the entire circumference of those annular walls. These dilution holes 30 are aligned on a circumferential row that is offset axially downstream from the rows of primary holes 28, and they may have differing diameters, in particular an alternation of large holes and small holes. In the configuration shown in FIG. 2, these dilution holes of different diameters nevertheless all have a downstream edge aligned on a common line 30A.

Figure 2:
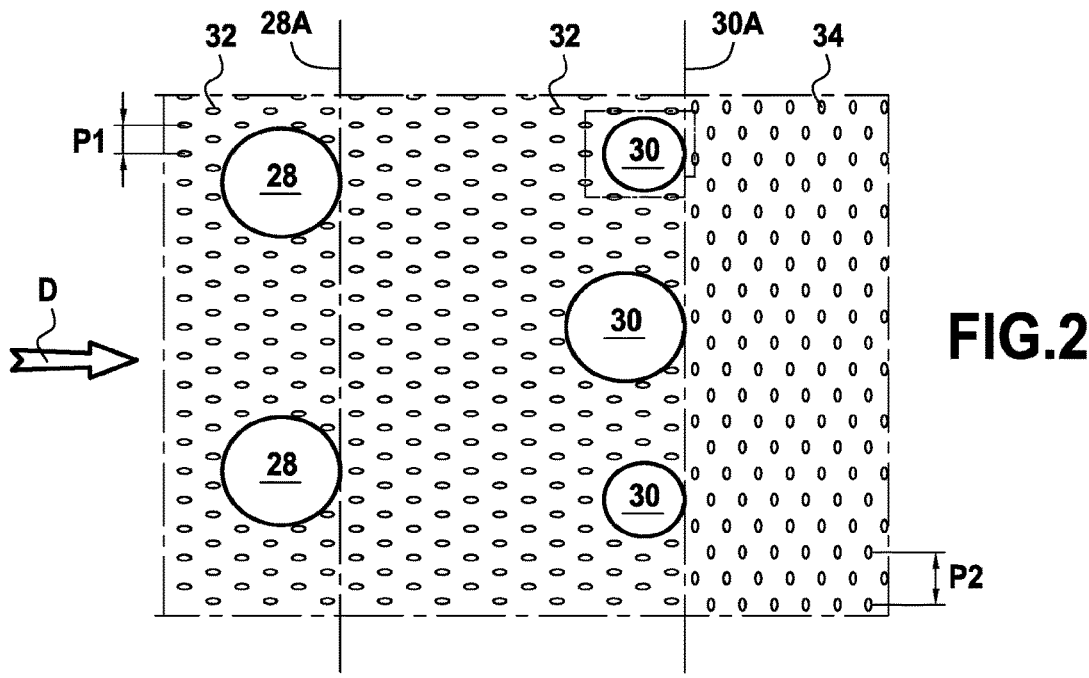
FIG. 2 is a fragmentary and developed view of one of the annular walls of the FIG. 1 combustion chamber in an embodiment of the invention.
Figure 3:
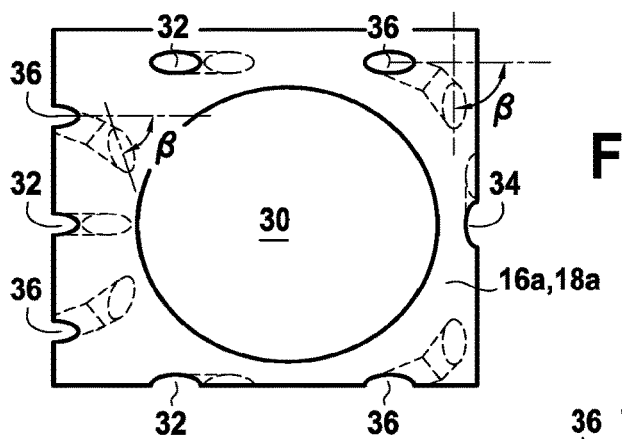
FIGS. 3 and 4 are fragmentary views respectively from above and in perspective showing a portion of the FIG. 2 annular wall.

In order to cool the inner and outer annular walls 16 and 18 of the combustion chamber, which are subjected to the high temperatures of the combustion gas, provision is made for a plurality of cooling orifices 32 (shown in FIGS. 2 to 4). In a reverse flow combustion chamber, the return bend is also provided with such orifices.

These orifices 32 that serve to cool the walls 16 and 18 via multiple holes, also referred to as "multi-perforation", are distributed over a plurality of circumferential rows that are axially spaced apart from one another. These rows of multi-perforation orifices generally cover the entire surface area of the annular walls of the combustion chamber. The number and the diameter $d_1$ of cooling orifices 32 are identical in each of the rows. The pitch $p_1$ between two orifices in a given row is constant and may optionally be identical for all of the rows. Furthermore, the adjacent rows of orifices are arranged in such a manner that the orifices 32 are arranged in a staggered configuration, as shown in FIG. 2.

As shown in FIG. 4, the cooling orifices 32 generally present an angle of inclination $\theta_1$ relative to a normal N to the annular wall 16, 18 through which they are formed. This angle of inclination $\theta_1$ enables the air passing through these orifices to form a film of air along the hot side 16b, 18b of the annular wall. Compared with orifices without an angle of inclination, they serve to increase the area of the annular wall that is cooled. Furthermore, the angle of inclination $\theta_1$ of the cooling orifices 32 is directed in such a manner that the film of air formed thereby flows in the flow direction of the combustion gas inside the chamber (represented by arrow D).

By way of example, for an annular wall 16, 18 made of metal or ceramic material and having thickness lying in the range 0.6 millimeters (mm) to 3.5 mm, the diameter $d_1$ of the cooling orifices 32 may lie in the range 0.3 mm to 1 mm (preferably in the range 0.4 mm to 0.6 mm), the pitch $p_1$ may lie in the range 1 mm to 10 mm, and their angle of inclination $\theta_1$ may lie in the range +30° to +70°, typically being +60°. By way of comparison, for an annular wall having the same characteristics, the primary holes 28 and the dilution holes 30 possess a diameter of the order 4 mm to 20 mm.

Furthermore, in order to ensure effective cooling downstream from the dilution holes, each annular wall 16, 18 of the combustion chamber may also include a plurality of additional cooling orifices 34 arranged directly downstream from the dilution holes 30 (but a similar configuration downstream from the primary holes 28 is also possible in order to limit the rise of the temperature gradient at the holes and thus avoid cracks forming) and distributed in a plurality of circumferential rows going from the upstream transition axis 30A. Nevertheless, unlike the above cooling orifices, which deliver a film of air flowing in the axial direction D, the film of air delivered by these additional orifices flows in a perpendicular direction as a result of them being arranged at 90° in a plane perpendicular to the axial flow direction D of the combustion gas. This multi-perforation performed perpendicularly to the axis of the engine (in the description below, this is referred to as gyratory multi-perforation as contrasted with the axial multi-perforation of the cooling orifices) enables the additional orifices to be located closer to the dilution holes (or to primary holes, if necessary) and thus serves to limit the rise in the temperature gradient at these holes.

The additional orifices 34 in a given row present the same diameter d2, preferably identical to the diameter d1 of the cooling orifices 32, they are spaced apart at a constant pitch p2 that may optionally be identical to the pitch p1 between the cooling orifices 32, and they present an angle of inclination θ2 that is preferably identical to the angle of inclination θ1 of the cooling orifices 32, but arranged in a perpendicular plane. Nevertheless, these characteristics of the additional orifices 34 may be perceptibly different from the characteristics of the cooling orifices 32 while remaining in the above-defined ranges of values, i.e. the angle of inclination θ2 of the additional orifices in a given row relative to a normal N of the annular wall 16, 18 may be different from the angle of inclination θ1 of the cooling orifices, and the diameter d2 of the additional orifices in a given row may be different from the diameter d1 of the cooling orifices 32.

In the invention, good cooling around the dilution holes and around the primary holes is obtained by using dynamic pressure on the cold side (between the casing and the chamber wall) while conserving the gyratory effect on the hot side. To do this, provision is made in the zones having a steep temperature gradient such as the primary or dilution holes, to provide multi-perforation holes 36 that are bent by an angle α greater than 90° in the chamber wall, so that they are fed by the total pressure of the air on the cold side, as for axial multi-perforation, while opening out on the hot side in the manner of gyratory multi-perforation. Specifically, in known manner, with gyratory multi-perforation at 90°, the holes are fed by the static pressure of the air between the casing 12 and the chamber wall, whereas with axial multi-perforation, the holes are fed by the total pressure of the air. The fact of being fed by the static pressure implies that no use is made of the dynamic pressure of the air (P total–P static) between the casing and the wall of the chamber. However, this dynamic pressure is particularly large at the primary holes and the dilution holes.

The angle α typically lies in the range 90° to 170° and is measured between an inlet axis Ae and an outlet axis As of the multi-perforation hole, the outlet axis (axis of the hole beside the hot wall) being inclined at an angle θ3 relative to the normal N to the annular wall but in a plane that is itself inclined at an angle β in a gyratory direction that is at most perpendicular to the axial direction D of the combustion gas flow. Typically, this gyration angle β lies in the range 50° to 90°.

These multi-perforation holes 36 present a diameter d3 that is preferably identical to the diameter d1 of the cooling orifices 32 and an outlet angle of inclination θ3 that is preferably identical to the angle of inclination θ1 of the orifice orifices 32. Likewise, the inlet axis (axis of the hole on the cold side) may be straight (parallel to the normal N) or preferably presents an angle of inclination θ4 (preferably identical to the angle of inclination θ1 of the cooling orifices 32) relative to the normal in the axial flow direction D of the combustion gas. Nevertheless, while remaining within the above-defined ranges of values for the cooling orifices 32, these various characteristics may be substantially different from those of the cooling orifices.

It may be observed that in these steep temperature gradient zones, the profile of each multi-perforation hole 36 may advantageously vary, i.e. it may have an angle d3, angles of inclination θ3 and θ4 (and thus an angle α), and a gyration angle β that differ from one hole to another, so as to optimize cooling locally.

It should also be observed that for a hole having a diameter of 0.4 mm, the lateral heat exchange area (area wetted by the air passing through the hole) is identical for all three types of multi-perforation hole. Thus, it is possible to determine this lateral heat exchange area S using the following formula:

$$S = \pi * d3 * L$$

where L is the length of the hole, giving:

for an axial straight hole 32 S equal to 3 square millimeters (mm²);

for a gyratory straight hole 34 at 90°, S equal to 3.04 mm²; and for a hole 36 having a 90° bend, S equal to 3.06 mm². The hole with a bend therefore does not degrade cooling of the wall by the force convection of the air flowing therethrough.

With the multi-perforation made up of three bends, using the dynamic pressure of the air flowing between the casing and the wall of the combustion chamber that is not used with the gyratory multi-perforation, enables cooling to be performed simply and with much greater effectiveness around the primary and dilution holes by appropriately placing these holes with bends.

Figure 5:
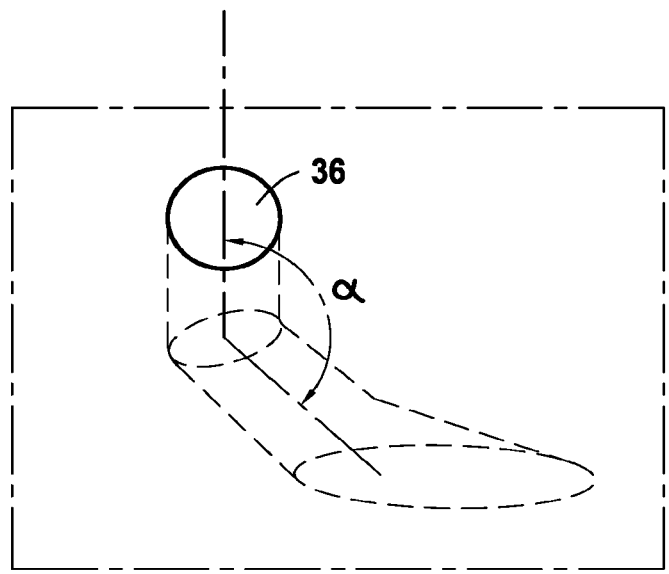
FIGS. 5 and 6 how two variant embodiments of angled multi-perforation holes in one of the annular walls of the FIG. 1 combustion chamber.
Figure 6:
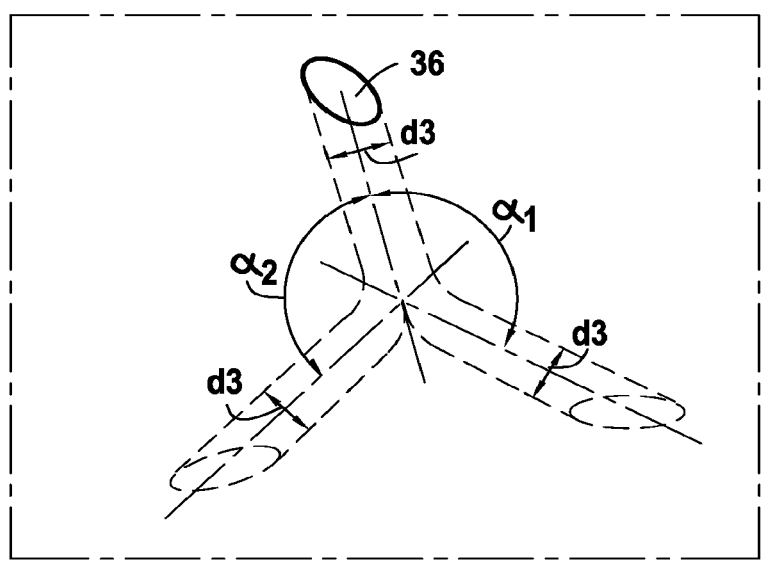

In a variant embodiment shown in FIG. 5, the outlet of the multi-perforation hole 36 opening out in the hot side may have a diameter d3 that varies so as to form a cone instead of being constant as described above, but rather having its diameter d3 increasing on approaching the air outlet. Likewise, as shown in FIG. 6, after the bend portion, the air outlet on the hot side may be split into two portions so as to increase the heat exchange area between the cooling air and the wall. The diameter d3 is preferably identical all along the multi-perforation hole 36, however the angles α1 and α2 between the inlet axis and the respective outlet axes of the two portions after the bend may be identical as shown, or they may be different. Nevertheless, as above, the air outlet forming the terminal portion of the hole may also present a varying diameter.

The invention claimed is:

1. An annular turbine engine combustion chamber wall comprising, between a cold side and a hot side:
   a plurality of air admission orifices distributed along at least one circumferential row to enable an air flowing on said cold side to penetrate to said hot side; and
   a plurality of cooling orifices to enable the air flowing on said cold side to penetrate to said hot side in order to form a film of cooling air along said annular wall, said cooling orifices being distributed in a plurality of circumferential rows that are axially spaced apart from one another, and axes of each of said cooling orifices being inclined in an axial flow direction of a combustion gas at an angle of inclination θ1 relative to a normal to said annular turbine engine combustion chamber wall; and
   in zones around a circumference of each of said plurality of air admission orifices, multi-perforation holes having respective bends of an angle α equal or greater than 90°, said angle α being measured between an inlet axis and an outlet axis of each of said multi-perforation hole, each said outlet axis of said multi-perforation holes being inclined at an angle θ3 relative to said normal to said annular turbine engine combustion chamber wall through which said multi-perforation holes with bends of an angle β lying in a range of 50° to 90° to said axial flow direction of the combustion gas wherein the multi-perforation holes and the cooling orifices alternate around at least a portion of a circumference of said plurality of air admission orifices.

2. The annular turbine engine combustion chamber wall according to claim 1, wherein said angle α lies in a range of 90° to 170°.

3. The annular turbine engine combustion chamber wall according to claim 1, wherein said multi-perforation holes present a diameter that is identical to a diameter of said cooling orifices, and said angle θ3 is identical to said angle of inclination θ1 of said cooling orifices.

4. The annular turbine engine combustion chamber wall according to claim 3, wherein said inlet axis of each of said multi-perforation holes is inclined at an angle θ4 relative to said normal to said annular turbine engine combustion chamber wall in the axial flow direction of the combustion gas, said angle θ4 being identical to said angle of inclination θ1 of said cooling orifices.

5. The annular turbine engine combustion chamber wall according to claim 3, wherein each of said multi-perforation holes presents a varying profile section so as to optimize cooling locally.

6. The annular turbine engine combustion chamber wall according to claim 1, wherein said multi-perforation holes split into two after a bend portion so as to form two air outlets opening out into the hot side.

7. The annular turbine engine combustion chamber wall according to claim 1, wherein an air outlet opening out into the hot side of each of said multi-perforation holes presents a varying diameter in a shape of a cone.

8. The annular turbine engine combustion chamber wall according to claim 1, wherein said plurality of air admission orifices are primary holes enabling the air flowing on said cold side to penetrate to said hot side in order to create an air/fuel mixture.

9. The annular turbine engine combustion chamber wall according to claim 8, wherein said plurality of air admission orifices are dilution holes enabling the air flowing on said cold side to penetrate to said hot side in order to dilute the air/fuel mixture.

10. A turbine engine combustion chamber having at least one annular wall according to claim 1.

11. A turbine engine including a combustion chamber having at least one annular wall according to claim 1.

* * * * *